July 2, 1940.　　　　A. W. DETJEN　　　　2,206,810
PISTON EXPANDER
Filed Jan. 6, 1940
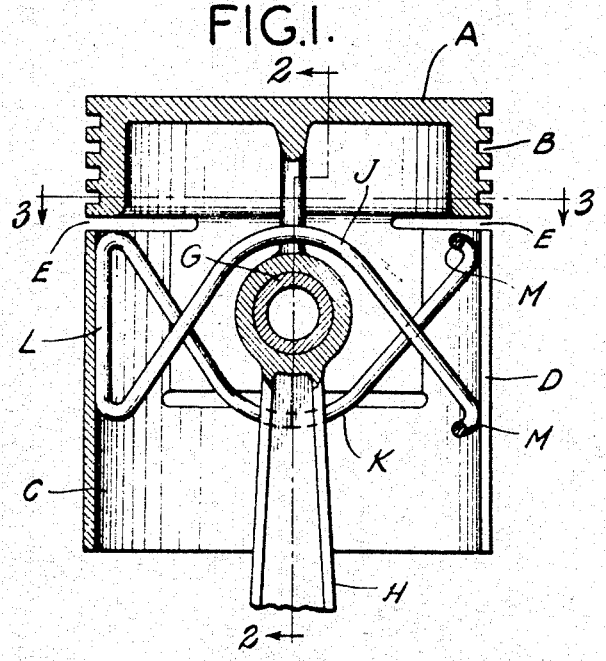
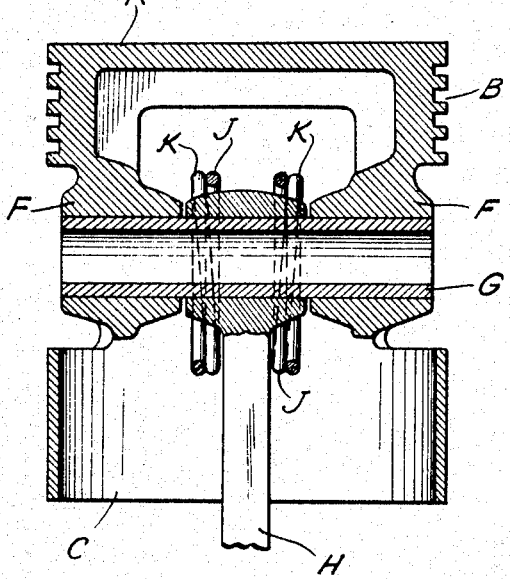
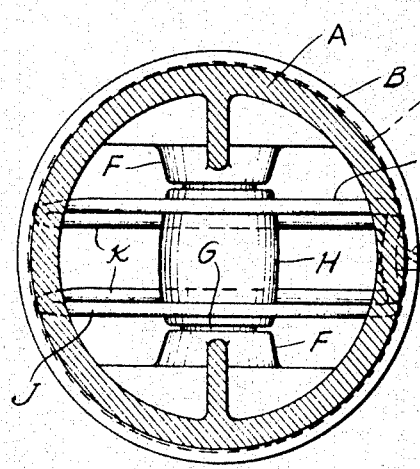
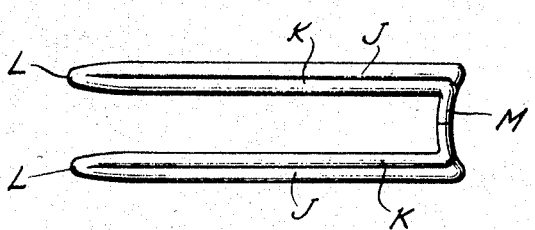
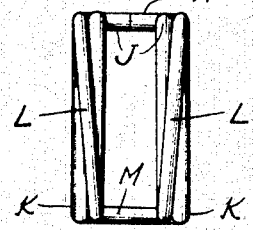
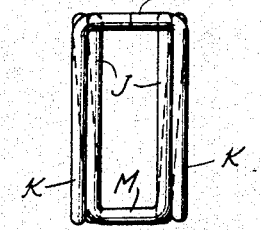
INVENTOR:
ALBERT W. DETJEN,
By J. Henry Kneedly
ATTORNEY.

Patented July 2, 1940

2,206,810

UNITED STATES PATENT OFFICE 2,206,810

PISTON EXPANDER

Albert W. Detjen, Glendale, Mo., assignor to McQuay-Norris Manufacturing Company, St. Louis, Mo., a corporation of Delaware Application January 6, 1940, Serial No. 312,768

7 Claims. (Cl. 309—12)

My invention relates to piston expanders and more particularly to piston expanders which are inherently resilient and are arranged to open up or increase the effective diameter of the skirt of a worn piston so that after expansion of the piston a good fit will be obtained between it and the wall of the cylinder.

Heretofore, expanders of this type have been made in various shapes and types, but most of them have had major deficiencies in construction so that they did not properly expand the skirt, or the expanders heretofore used were subject to easy breakage or were so intricate in design as to be extremely costly to manufacture.

The objects of this invention are to provide a resilient expander which will increase the effective diameter of the piston skirt to the proper degree; to provide an expander which will not become dislodged accidentally from its place in the piston during operation of the engine or other device in which the expander is used; and to provide an expander which will be simple in design and cheap to manufacture.

In the accompanying drawing wherein similar characters are used to designate similar parts, I have shown one embodiment of my invention. In the drawing, Fig. 1 is a section through a piston and its included expander; Fig. 2 is a section along the lines 2—2 in Fig. 1; Fig. 3 is a section along the lines 3—3 in Fig. 1; Figs. 4 and 5 show the expander, as removed from the piston, in plan and elevation, and Figs. 6 and 7 are views of the expander as indicated in Fig. 5.

Referring to the figures the form of my expander as shown therein is included in a piston of the usual split skirt type and which piston comprises a head A including a ring belt B and a skirt C slotted axially as at D and separated from the head throughout a major portion of its periphery by circumferentially extending slots E. Of course, the piston also has the conventional pin bosses F arranged to receive a wrist pin G on which is mounted a connecting rod H. However, the structure of the piston is no part of my invention because my new and improved expander may be included in any piston which is susceptible to expansion.

An expander made according to my invention may be formed from any suitable material but in the embodiment shown it is formed of spring wire of proper gauge and resilience. The expander comprises a plurality of spring members J and K arranged in pairs so that, in effect, each pair of members J and K extends across the hollow interior of the piston and engages the inner surface of the piston skirt at substantially diametrically opposed points, each of which points is removed approximately ninety degrees from the pin bosses. Preferably, the members J and K of a pair are each of general U-shaped formation and are arranged in opposed relation. That is, the legs of the U in one member extend toward the bottom of the U of the other member so that each leg of one member crosses a leg of the other member. The ends of the members J and K engage the piston skirt to exert an expansive force thereagainst.

In the specific form or embodiment shown in the drawing and described herein to illustrate my invention the expander comprises two pairs of members J and K and is formed from a single piece of spring wire, as shown clearly in Figs. 4 to 7, inclusive. The members J and K of each pair are joined at one end thereof by a straight portion L arranged to bear against the piston skirt and the opposite ends of the pair of members J and K are bent to form an integral connecting piece M between the members in one pair and the members in the other pair. Preferably, the free ends of the piece of wire from which the expander is formed are arranged to meet in a connecting piece M, as shown in Fig. 4, and are welded together to avoid vibration of these ends.

When the expander is inserted in a piston, of course, the skirt contacting parts are forced toward one another and may be tied in this position until the expander has been slipped upwardly through the open end of the piston from which the wrist pin J and connecting rod H have been removed. The expander is moved until it is in the position shown in Fig. 1. The skirt engaging portions are then released and they will spring outwardly to engage the skirt and expand it. If the expander is arranged in the piston as shown when the expansive force exerted against the skirt will be along a line approximately at right angles to the axis of the wrist pin. Also, the members J and K will be positioned one above and one below the wrist pin and the legs of these members will cross at each side of the pin bosses.

It should be understood that I do not intend to limit myself to the exact form of construction shown in the drawing because the size, shape and arrangement of the parts and the material from which they are formed may be varied in other forms of expanders within wide limits without deviating from the spirit of my invention. For instance, in some cases a single pair of members J and K will be sufficient to expand the piston skirt properly and effectively.

What I claim as new and desire to secure by Letters Patent, is:

1. A piston expander comprising a pair of spring members adapted to extend across the hollow interior of a piston and arranged to engage the piston skirt at opposed points removed substantially ninety degrees from the pin bosses of the piston, and said members being formed to cross one another at each side of said pin bosses.

2. A piston expander comprising a pair of U-shaped spring members arranged in opposed relation with each leg of one member crossing a leg of the other member and said legs being arranged to engage the skirt of a piston at substantially diametrically opposed points.

3. A piston expander comprising a pair of U-shaped spring members arranged in opposed relation with each leg of one member crossing a leg of the other member and said legs being arranged to engage the skirt of a piston at substantially diametrically opposed points, and adjacent ends of said legs being connected by an integral straight portion extending therebetween.

4. A piston expander comprising a pair of U-shaped spring members arranged in opposed relation, said members each being adapted to extend across the hollow interior of a piston and arrange to engage the piston skirt at opposed points, and said members being positioned whereby the legs thereof cross one another at each side of the pin bosses of said piston.

5. A piston expander comprising a plurality of pairs of spring members each adapted to extend across the hollow interior of a piston and arranged to engage the piston skirt at opposed points removed substantially ninety degrees from the pin bosses of the piston, and the members of each of said pairs being formed to cross one another at each side of said pin bosses.

6. A piston expander comprising a plurality of pairs of U-shaped spring members with the members in each pair arranged in opposed relation and with each leg of one member in said pair crossing a leg of the other member and said legs being arranged to engage the skirt of a piston at substantially diametrically opposed points.

7. A piston expander comprisng a plurality of pairs of U-shaped spring members with the members in each pair arranged in opposed relation and with each leg of one member in said pair crossing a leg of the other member, said legs being arranged to engage the skirt of a piston at substantially diametrically opposed points, and an integral connecting part extending between one pair of said members and the pair adjacent thereto.

ALBERT W. DETJEN.